(12) United States Patent
Wang et al.

(10) Patent No.: US 11,513,317 B2
(45) Date of Patent: Nov. 29, 2022

(54) LENS DEVICE UNDER COVER GLASS AND LENS ASSEMBLY

(71) Applicants: Sintai Optical (Shenzhen) Co., Ltd., ShenZhen (CN); Asia Optical Co., Inc., Taichung (TW)

(72) Inventors: Po-Jen Wang, Taichung (TW); Hsi-Ling Chang, Taichung (TW); Guo-Yang Wu, Taichung (TW); Ming-Huang Tseng, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 353 days.

(21) Appl. No.: 16/988,761

(22) Filed: Aug. 10, 2020

(65) Prior Publication Data
US 2021/0096323 A1 Apr. 1, 2021

(30) Foreign Application Priority Data
Aug. 23, 2019 (TW) .................................. 108130317

(51) Int. Cl.
*G02B 9/12* (2006.01)
*G02B 1/14* (2015.01)
*G02B 5/12* (2006.01)

(52) U.S. Cl.
CPC ................. *G02B 9/12* (2013.01); *G02B 1/14* (2015.01); *G02B 5/12* (2013.01)

(58) Field of Classification Search
CPC .. G02B 1/14; G02B 13/0035; G02B 13/0065; G02B 2003/0093; G02B 5/12; G02B 9/12
See application file for complete search history.

(56) References Cited

U.S. PATENT DOCUMENTS

| | | | |
|---|---|---|---|
| 8,098,319 B2 | 1/2012 | Demuynck | |
| 9,958,643 B2 | 5/2018 | Lai et al. | |
| 10,436,954 B2 | 10/2019 | Shih et al. | |
| 2018/0321456 A1* | 11/2018 | Chang | .................... G02B 7/021 |
| 2019/0227199 A1 | 7/2019 | Kao et al. | |

FOREIGN PATENT DOCUMENTS

| | | |
|---|---|---|
| CN | 107643584 A | 1/2018 |
| TW | I627439 A | 3/2019 |

* cited by examiner

*Primary Examiner* — Joseph P Martinez
*Assistant Examiner* — Vipin Patel
(74) *Attorney, Agent, or Firm* — McClure, Qualey & Rodack, LLP

(57) ABSTRACT

A lens assembly is configured to be disposed under a cover glass, in a gap region and outside a display region, including a plurality of lenses, a reflector and an image sensor. The lenses, the reflector and the image sensor are sequentially arranged from an object side to an image side along an optical axis. One of the lenses is adjacent to the object side, has a minimum diameter of clear aperture, and has an outer circumferential portion which is non-circular. The lens assembly satisfies at least one of following conditions: BFL≥VL and BFL≥0.6×DL where BFL is a back focal length of the lens assembly, VL is a minimum side length of the image sensor, and DL is a diagonal length of the image sensor. A lens device includes a cover glass, a case, a display panel and the lens assembly.

20 Claims, 10 Drawing Sheets

LENS DEVICE UNDER COVER GLASS AND LENS ASSEMBLY

BACKGROUND OF THE INVENTION

Field of the Invention

The invention relates to a lens device under cover glass and a lens assembly, and more particularly to a lens device embedded under a cover glass of a smart phone and a lens assembly.

Description of the Related Art

FIG. 1A depicts a known lens assembly for a smart phone which sequentially includes, from an object side to an image side along an optical axis, a plurality of lenses 1, an optical filter 3 and an image sensor 2. A known lens assembly for a smart phone has an outer periphery which always appears round as shown in FIG. 1B. Such a lens assembly occupies much space that reduces the available region of the cover glass of the smart phone so that showing pictures in full screen is difficult. As a result, part of the display screen cannot be used that leads to a design compromise, for example, iPhone X notch. Therefore, the invention provides a lens device under cover glass which differs from the conventional one having a round lens assembly. The lens device of the invention is applicable to a smart phone to increase the display area thereof.

BRIEF SUMMARY OF THE INVENTION

The invention provides a lens assembly and a lens device including the lens assembly. The lens device can be disposed under the cover glass of a smart phone, a tablet computer or other smart mobile devices and disposed in a storage space between the display panel and the outer case. By such arrangement, the lens device of the invention can be hidden.

A lens assembly in accordance with an exemplary embodiment of the invention includes a plurality of lenses, a reflector, and an image sensor. The lenses, the reflector and the image sensor are sequentially arranged from an object side to an image side along an optical axis. One of the lenses is adjacent to the object side, has an outer circumferential portion which is non-circular, and has a minimum dimension of clear aperture measured along a line passing through the optical axis. The lens assembly satisfies at least one of following conditions: BFL≥VL; and BFL≥0.6×DL, where BFL is a back focal length of the lens assembly, VL is a minimum side length of the image sensor, and DL is a diagonal length of the image sensor.

In another exemplary embodiment, the lens assembly further satisfies condition BFL>LL where LL is a distance between an object side surface of the lens which is closest to the object side and an image side surface of another lens which is closest to the image side along the optical axis.

In yet another exemplary embodiment, the lens assembly further satisfies at least one of following conditions: 1.1<(TTL/BFL)<2 and 1<(BFL/f)<1.6 where TLL is a total track length of the lens assembly and f is an effective focal length of the lens assembly.

In another exemplary embodiment, the lens assembly further satisfies at least one of following conditions: 0.6<CAMN<2 and 2.5<(BFL/CAMN)<6 where CAMN is a minimum dimension of clear aperture of the lenses that is measured along a line passing through the optical axis.

In yet another exemplary embodiment, the lens assembly further satisfies condition 2<(BFL/D1)<4 where D1 is a dimension of clear aperture of an object-side surface of the lens adjacent to the object side, measured along a line passing through the optical axis.

In another exemplary embodiment the lens assembly further satisfies condition 0.1<(ALT/BFL)<0.6 where ALT is a sum of thicknesses of the lenses measured along the optical axis without including air spacing between the lenses.

In yet another exemplary embodiment, the lens assembly further satisfies condition 0.5<(D1/ALT)<1.5.

In another exemplary embodiment, the reflector is a prism or a reflective mirror, and the reflector comprises a reflecting surface with a metal film formed thereon.

In yet another exemplary embodiment, the lenses include a first lens and a second lens. The first lens, the second lens, and the reflector are sequentially arranged from the object side to the image side along the optical axis. The first lens is with refractive power. The second lens is with refractive power, has a surface facing the object side, intersecting with the optical axis, and being concave toward the image side, and has another surface facing the image side, intersecting with the optical axis, and being convex toward the image side. The stop is disposed between the object side and the second lens.

In another exemplary embodiment, the first lens is with positive refractive power and has a surface intersecting with the optical axis, facing the image side, and being convex toward the image side; and the second lens is with negative refractive power.

In yet another exemplary embodiment, the first lens is with negative refractive power. The first lens has a surface intersecting with the optical axis, facing the object side, and being convex toward the object side, and has another surface intersecting with the optical axis, facing the image side, and being concave toward the object side. The second lens is with positive refractive power.

In another exemplary embodiment, the lenses further include a third lens disposed between the first lens and the second lens. The first lens, the third lens, and the second lens are sequentially arranged from the object side to the image side along the optical axis. The first lens is with positive refractive power. The third lens is with positive refractive power. The third lens has a surface intersecting with the optical axis, facing the object side, and being concave toward the image side, and has another surface intersecting with the optical axis, facing the image side, and being convex toward the image side. The second lens is with negative refractive power.

In yet another exemplary embodiment, the first lens has a surface intersecting with the optical axis, facing the object side, and being convex toward the object side, and has another surface intersecting with the optical axis, facing the image side, and being concave toward the object side.

In another exemplary embodiment, the first lens has a surface intersecting with the optical axis, facing the object side, and being concave toward the image side, and has another surface intersecting with the optical axis, facing the image side, and being convex toward the image side.

A lens device in accordance with an exemplary embodiment of the invention includes a cover glass, a case, a display panel and the above-mentioned lens assembly. The display panel is disposed adjacent to the cover glass wherein a gap is formed between the display panel and the case, thereby forming a display region where the cover glass covers the display panel and forming a gap region where the cover glass covers the gap. The lens assembly is configured to be disposed under the cover glass, in the gap region and outside the display region. The lens assembly further includes another reflector and a stop. Another reflector is disposed between the cover glass and the plurality of lenses, and the stop is disposed in the plurality of lenses. Light from the object side is configured to propagate through the cover glass, another reflector, the plurality of lenses and the reflector to the image sensor.

In another exemplary embodiment, the lens device includes a case, a display panel, and the above-mentioned lens assembly. A gap is formed between the display panel and the case, thereby forming a display region and a gap region. The lens assembly is configured to be disposed in the gap region and outside the display region.

In yet another exemplary embodiment, the lens device further includes a cover glass. The display panel is disposed adjacent to the cover glass. The display region is located at where the cover glass covers the display panel. The gap region is located at where the cover glass covers the gap. The lens assembly is further disposed under the cover glass. The lenses include a first lens and a second lens sequentially arranged from the object side to the image side along the optical axis, and the second lens has a concave surface facing the object side and a convex surface facing the image side.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

A lens device of the invention can be disposed under the cover glass of a smart phone, a tablet computer or other smart mobile devices. A smart phone is taken as an example to introduce the following embodiments but the invention is not limited thereto.

Figure 1A:
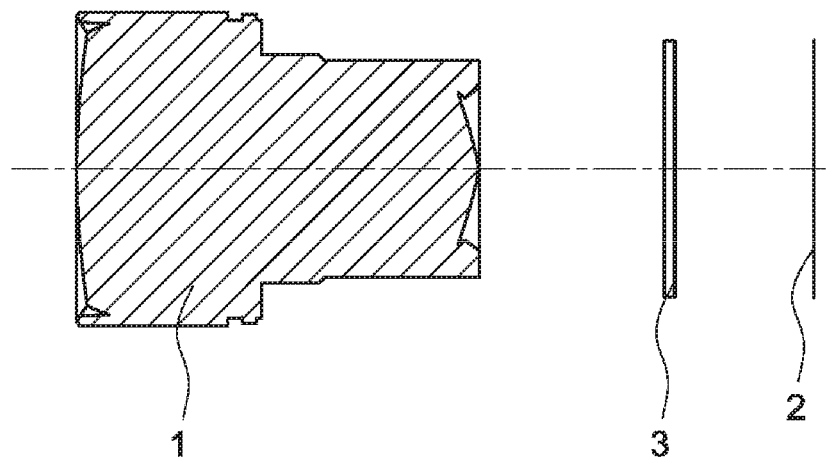
FIG. 1A is a schematic diagram of a known lens assembly for a smart phone.
Figure 1B:
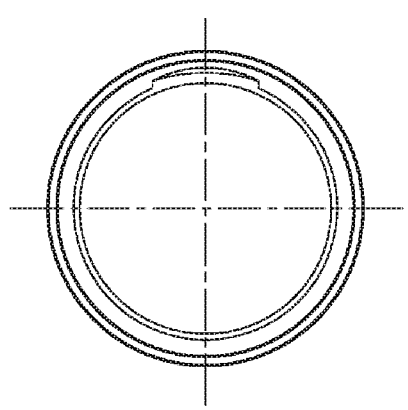
FIG. 1B is a schematic diagram of a known lens assembly for a smart phone, observed from an object side along an optical axis.
Figure 2:
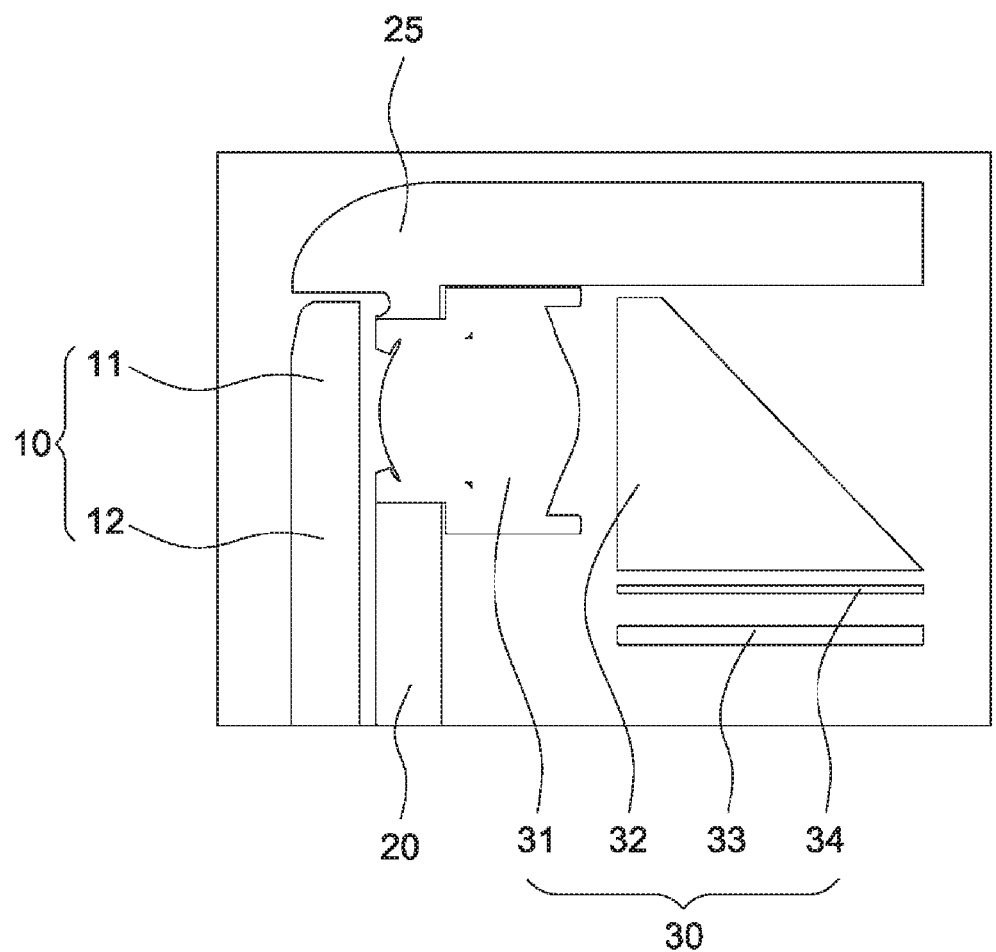
FIG. 2 is a schematic diagram of a lens device under cover glass in accordance with the invention.

As shown in FIG. 2, a lens device of the invention includes a case 25, a cover glass 10, a display panel 20 and a lens assembly 30. The cover glass 10 is embedded onto the case 25 to form a storage space. The display panel 20 is disposed adjacent to the cover glass 10. The display panel 20 may be, for example, a liquid crystal display (LCD). The cover glass 10 is slightly larger than the display panel 20. The display panel 20 and the case 25 have a gap therebetween. The cover glass 10 is able to provide a gap region 11 corresponding to the gap and a display region 12 corresponding to the display panel 20. The lens assembly 30 sequentially includes, from an object side to an image side along an optical axis, a plurality of lenses 31, a reflector 32, an optical filter 34 and an image sensor 33.

Figure 3A:
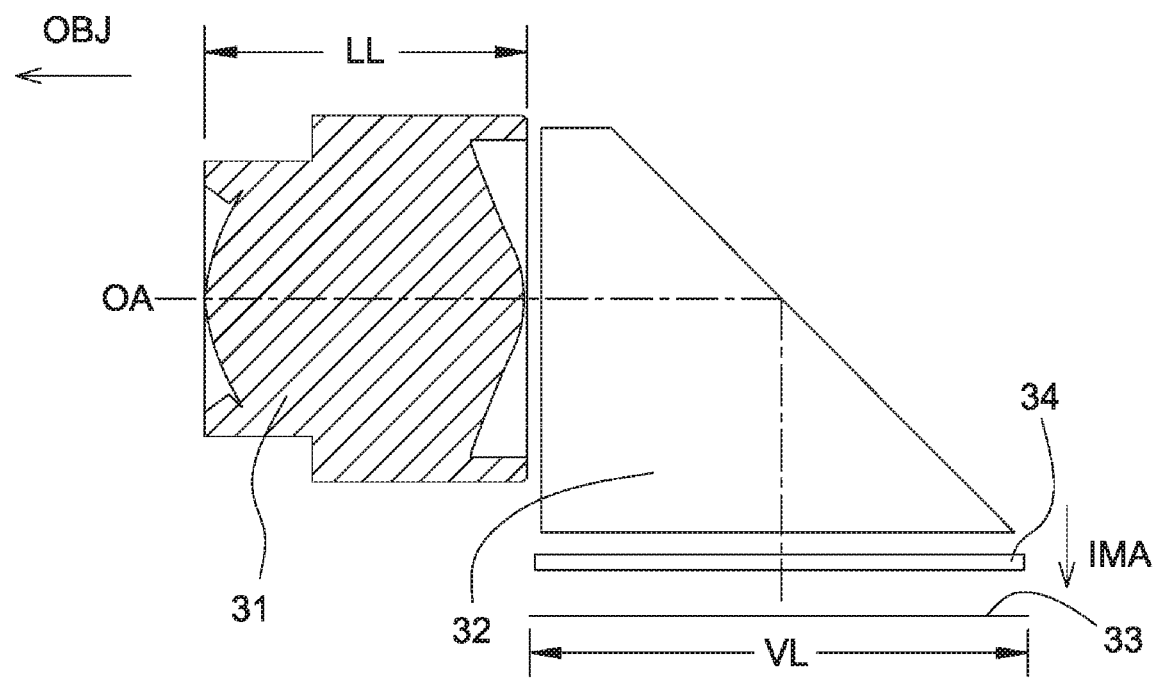
FIG. 3A is a sectional view of a lens assembly of the lens device under cover glass in accordance with the invention.
Figure 3B:
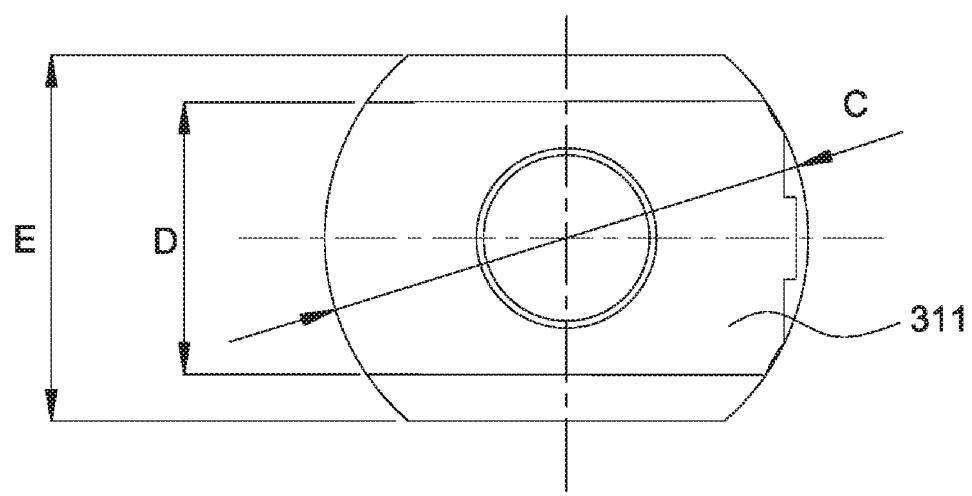
FIG. 3B is a schematic diagram of the lens assembly of the lens device under cover glass in accordance with the invention, observed from the object side along an optical axis.

Referring to FIGS. 3A and 3B, FIG. 3A is a sectional view of the lens assembly of the lens device under cover glass and FIG. 3B depicts the lens assembly of the lens device under cover glass observed from the object side along an optical axis. As shown, a lens barrel 311 envelops the lenses 31 among which the lens adjacent to the object side has a minimum dimension of clear aperture and a non-circular outer circumferential portion. Therefore, the lens barrel 311 has a stepped portion in a non-circular shape corresponding to the lens adjacent to the object side. A portion of the lens barrel 311 surrounding the lens adjacent to the object side has a minimum thickness D while another portion of the lens barrel 311 surrounding other lenses has a minimum thickness E. The lens barrel 311 has a maximum thickness C which is a dimension of the circular outer circumferential portion. Specifically, the non-circular outer circumferential portion of the lens barrel 311 has a maximum thickness C measured along a line passing through the optical axis OA and a minimum thickness D measured along another line passing through the optical axis OA, and the two lines intersects at an angle ranged from 10 degrees to 170 degrees.

The lens adjacent to the object side is shaped corresponding to the lens barrel 311 and therefore has a non-circular outer circumferential portion which has at least two parallel opposite sides. The parallel opposite sides can be formed by cutting, pressing or injection molding. Specifically, a lens having a circular outer circumferential portion can be cut to form the parallel opposite sides, or the cavity of a mold for pressing or injection molding has an inner circumferential portion with at least one pair of parallel opposite sides so that the lens made by pressing or injection molding can have a non-circular outer circumferential portion. In detail, the lens adjacent to the object side has two parallel straight sides and two curved sides (i.e. the non-circular outer circumferential portion of the lens has at least one straight side which is perpendicular to the optical axis). Therefore, the non-circular outer circumferential portion of the lens adjacent to the object side includes non-circular sides and circular sides. The non-circular sides are straight and parallel to each other. The circular sides can be regarded as a part of a complete circle. The non-circular sides and circular sides are arranged around a center where the optical axis passes through, and are connected to each other to form the non-circular outer circumferential portion.

The lens adjacent to the object side is not limited to the described shape. The lens may be in shape of polygon with sides arranged symmetrically with respect to the optical axis, bottle, oak-barrel, polygon, or be in any shape which includes straight side(s) and/or curved side(s).

Referring to FIGS. 1, 2, 3A and 3B, the lens disposed adjacent to the object side has a non-circular outer circumferential portion and the non-circular outer circumferential portion is disposed in a small space formed by the gap region 11, the display panel 20 and the case 25.

Figure 4A:
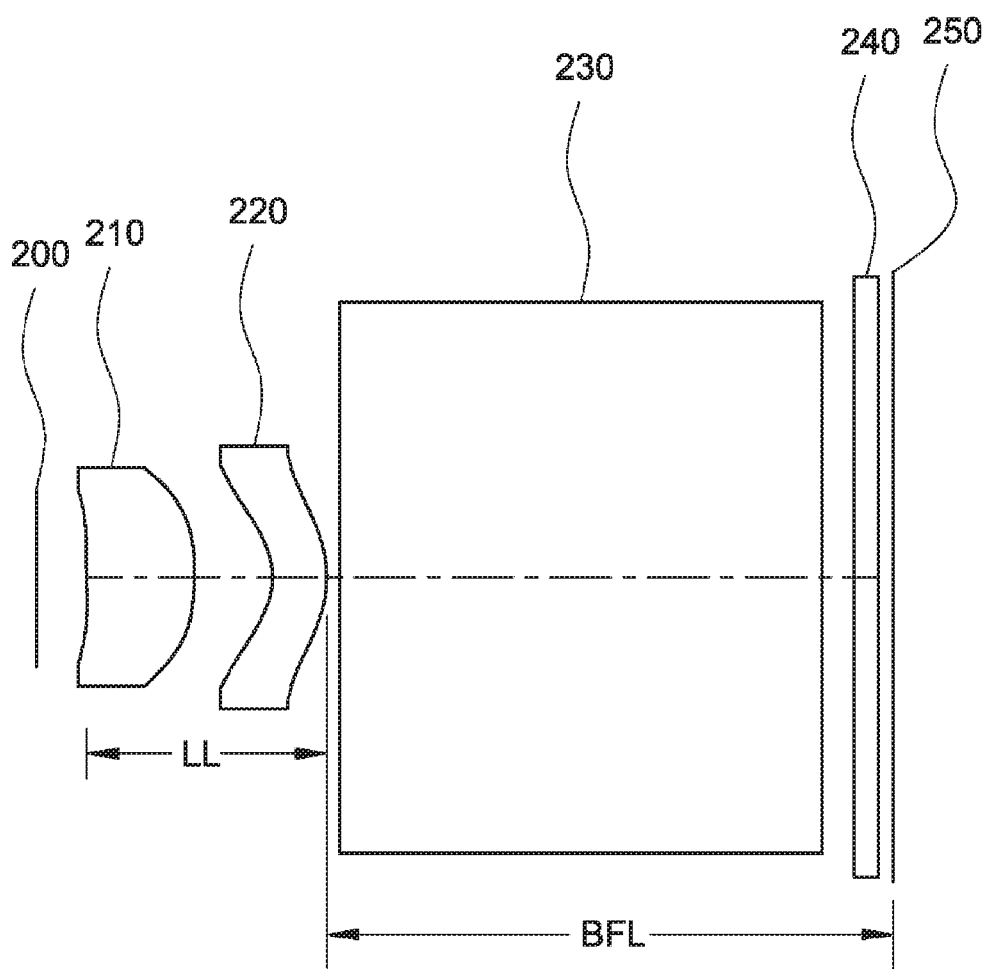
FIG. 4A is a schematic diagram of a lens assembly in accordance with a first embodiment of the invention.

FIG. 4A depicts a lens device under cover glass in accordance with a first embodiment of the invention, wherein a lens assembly sequentially includes, from an object side to an image side along an optical axis, a first lens 210, a second lens 220, a reflector 230, an optical filter 240 and an image sensor 250. The first lens 210 is a positive lens with positive refractive power and has a surface facing the object side that is convex toward the object side and another surface facing the image side that is convex toward the image side. The second lens 220 is a negative meniscus lens with negative refractive power and has a surface facing the object side that is concave toward the image side and another surface facing the image side that is convex toward the image side. The total lens length LL is measured from the surface of the first lens 210 facing the object side to the surface of the second lens 220 facing the image side along the optical axis. In other words, the total lens length LL is a distance between an object-side surface of a lens adjacent to the object side and an image-side surface of a lens adjacent to the image side. The back focal length BFL of the lens assembly is measured from the surface of the second lens 220 facing the image side to the image sensor 250 along the optical axis. The lens assembly is disposed adjacent to the cover glass 200. The first lens 210 has a minimum dimension, measured along a line passing through the optical axis, less than that of the second lens 220 so that the first lens 210 of the lens assembly of the first embodiment can be embedded in the small space formed by the gap region 11, the display panel 20 and the case 25 in accordance with FIG. 2.

The invention is not limited to the lens assembly described above. In every embodiments of the invention, an additional reflector may be provided between the cover glass 10 and the first lens of the lens assembly 30. In operation, the light from the object side propagates through the cover glass 10, the additional reflector, the plurality of lenses, and the reflector to the image sensor.

Table 1 shows the parameters of each lenses of the lens assembly of the first embodiment, wherein the effective focal length of the lens assembly is equal to 3.034 mm, the effective focal length of the first lens 210 is equal to 1.713 mm, the effective focal length of the second lens 220 is equal to −4.972 mm, the back focal length (BFL) is equal to 4.119 mm, the minimum side length VL of the image sensor 250 is equal to 2.748 mm, and the diagonal length DL of the image sensor 250 is equal to 4.58 mm. The total track length (TTL) of the lens assembly is equal to 6.20 mm. The view angle is equal to 73.72°. F-number is equal to 2.423.

TABLE 1

Effective Focal Length = 3.034 mm, F# = 2.423, View Angle = 73.72°

| Element | Radius of Curvature (mm) | Distance (mm) | Nd | Vd | Conic Constant |
|---|---|---|---|---|---|
| OBJ | 0 | Infinity | 0 | 0 | 0 |
| Stop | 0 | 0.35235 | 0 | 0 | 0 |
| First Lens | 12.62312 | 0.789534 | 1.66 | 65.0 | −4030.65 |
|  | −1.22327 | 0.546528 | 0 | 0 | −6.81323 |
| Second Lens | −0.59566 | 0.399592 | 1.87871 | 19.2 | −0.65188 |
|  | −0.90581 | 0.1 | 0 | 0 | −0.64931 |
| Prism | 0 | 3.5 | 2.020045 | 25.00295 | 0 |
|  | 0 | 0.2 | 0 | 0 | 0 |
| Optical Filter | 0 | 0.21 | 1.5168 | 64.2 | 0 |
|  | 0 | 0.108827 | 0 | 0 | 0 |
| Image Sensor | 0 | 0 | 0 | 0 | 0 |

The sag value z of the aspherical surface of each lens in Table 1 is expressed by the following equation:

$$z = ch^2 / \{1 + [1-(k+1)c^2h^2]^{1/2}\} + Ah^4 + Bh^6 + Ch^8 + Dh^{10} + Eh^{12} + Fh^{14} + Gh^{16} + Hh^{18} + Ih^{20}$$

wherein c is the curvature of the surface, h is the distance between the optical axis and a point on the lens surface in a direction vertical to the optical axis, k is the conic coefficient, and A to I are the aspheric coefficients.

Table 2 shows the parameters of the aspherical surfaces of each lens of Table 1, wherein A to I are the aspheric coefficients.

TABLE 2

| Surface of Element | A / F | B / G | C / H | D / I | E |
|---|---|---|---|---|---|
| Object Side Surface of First Lens | −0.05600024 / −50.59777168 | −1.50795964 / −57.60815466 | 9.32189481 / 42.59434729 | −43.07276778 / −48.35017369 | 87.95734466 |
| Image Side Surface of First Lens | −0.60959585 / 4.14576900 | 0.75663058 / −2.09690410 | −1.59104406 / 1.59633431 | 2.83119045 / −1.70998192 | −4.42976243 |
| Object Side Surface of Second Lens | 0.23978707 / −6.34563238 | 1.18047195 / 2.70089505 | 0.76329210 / −2.05308093 | −5.95629916 / 1.25659198 | 9.25506922 |
| Image Side Surface of Second Lens | 0.1313823 / 0.94716657 | 0.18187044 / −0.57668069 | 0.60405835 / −0.03102620 | −0.83291986 / 0.09456146 | −0.15594787 |

Figure 4B:
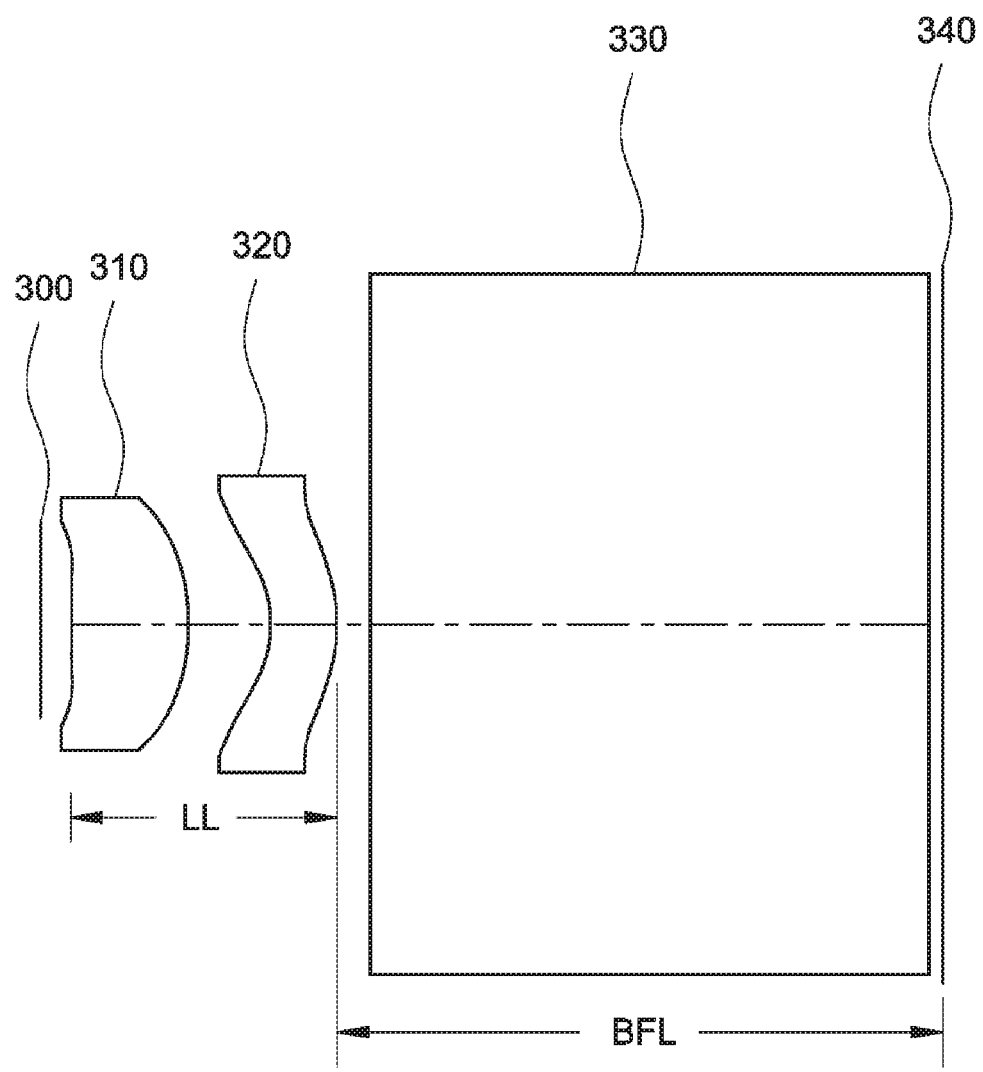
FIG. 4B is a schematic diagram of a lens assembly in accordance with a second embodiment of the invention.

FIG. 4B depicts a lens assembly in accordance with a second embodiment of the invention, which sequentially includes, from an object side to an image side along an optical axis, a first lens 310, a second lens 320, a reflector 330, and an image sensor 340. The first lens 310 is a positive meniscus lens with positive refractive power and has a surface facing the object side that is concave toward the image side and another surface facing the image side that is convex toward the image side. The second lens 320 is a negative meniscus lens with negative refractive power and has a surface facing the object side that is concave toward the image side and another surface facing the image side that is convex toward the image side. The total lens length LL is measured from the surface of the first lens 310 facing the object side to the surface of the second lens 320 facing the image side along the optical axis. The back focal length BFL of the lens assembly is measured from the surface of the second lens 320 facing the image side to the image sensor 340 along the optical axis. The lens assembly is disposed adjacent to the cover glass 300. The first lens 310 has a minimum dimension, measured along a line passing through the optical axis, less than that of the second lens 320 so that the first lens 310 of the lens assembly of the second embodiment can be embedded in the small space formed by the gap region 11, the display panel 20 and the case 25 in accordance with FIG. 2.

Table 3 shows the parameters of each lenses of the lens assembly of the second embodiment, wherein the effective focal length of the lens assembly is equal to 2.994 mm, the effective focal length of the first lens 310 is equal to 1.636 mm, the effective focal length of the second lens 220 is equal to −4.421 mm, the back focal length is equal to 3.780 mm, the minimum side length VL of the image sensor 340 is equal to 2.748 mm, and the diagonal length DL, of the image sensor 340 is equal to 4.58 mm. The total track length TTL of the lens assembly is equal to 5.63 mm. The view angle is equal to 74.44°. F-number is equal to 2.4.

TABLE 3

| | | | | |
|---|---|---|---|---|
| Effective Focal Length = 2.994 mm, F# = 2.4, View Angle = 74.44° | | | | |
| Element | Radius of Curvature (mm) | Distance (mm) | Nd | Vd | Conic Constant |
| OBJ | 0 | 350 | 0 | 0 | 0 |
| Stop | 0 | 0.191573 | 0 | 0 | 0 |
| First Lens | −996.66 | 0.723324 | 1.66 | 65.0 | −4030.65 |
| | −1.36231 | 0.496284 | 0 | 0 | −6.81323 |
| Second Lens | −0.70381 | 0.422635 | 1.87871 | 19.2 | −0.65188 |
| | −1.0875 | 0.2 | 0 | 0 | −0.64931 |
| Prism | 0 | 3.5 | 2.020045 | 25.00295 | 0 |
| | 0 | 0.08034 | 0 | 0 | 0 |
| Image Sensor | 0 | 0 | 0 | 0 | 0 |

The definition of the sag value z of the aspherical surfaces of each lens in Table 3 is identical to that in Table 1 of the first embodiment and therefore the descriptions thereof are omitted.

Table 4 shows the parameters of the aspherical surfaces of each lens of Table 3, wherein A to I are the aspheric coefficients.

TABLE 4

| Surface of Element | A / F | B / G | C / H | D / I | E |
|---|---|---|---|---|---|
| Object Side Surface of First Lens | −0.13853686 / −82.27521386 | −1.49895499 / −3.71961728 | 9.10909231 / 0 | −41.12912717 / 0 | 90.47967988 |
| Image Side Surface of First Lens | −0.64768817 / 4.02778011 | 0.83216599 / −1.90247044 | −1.62703376 / 0 | 2.73576915 / 0 | −4.13548987 |
| Object Side Surface of Second Lens | 0.22387988 / −0.69872908 | 0.75078164 / −0.35359682 | 0.51097982 / 0 | −3.11975872 / 0 | 3.25618222 |
| Image Side Surface of Second Lens | 0.04065153 / 0.22115044 | 0.04040591 / −0.08808905 | 0.66019319 / 0 | −0.82354751 / 0 | 0.15844149 |

Figure 4C:
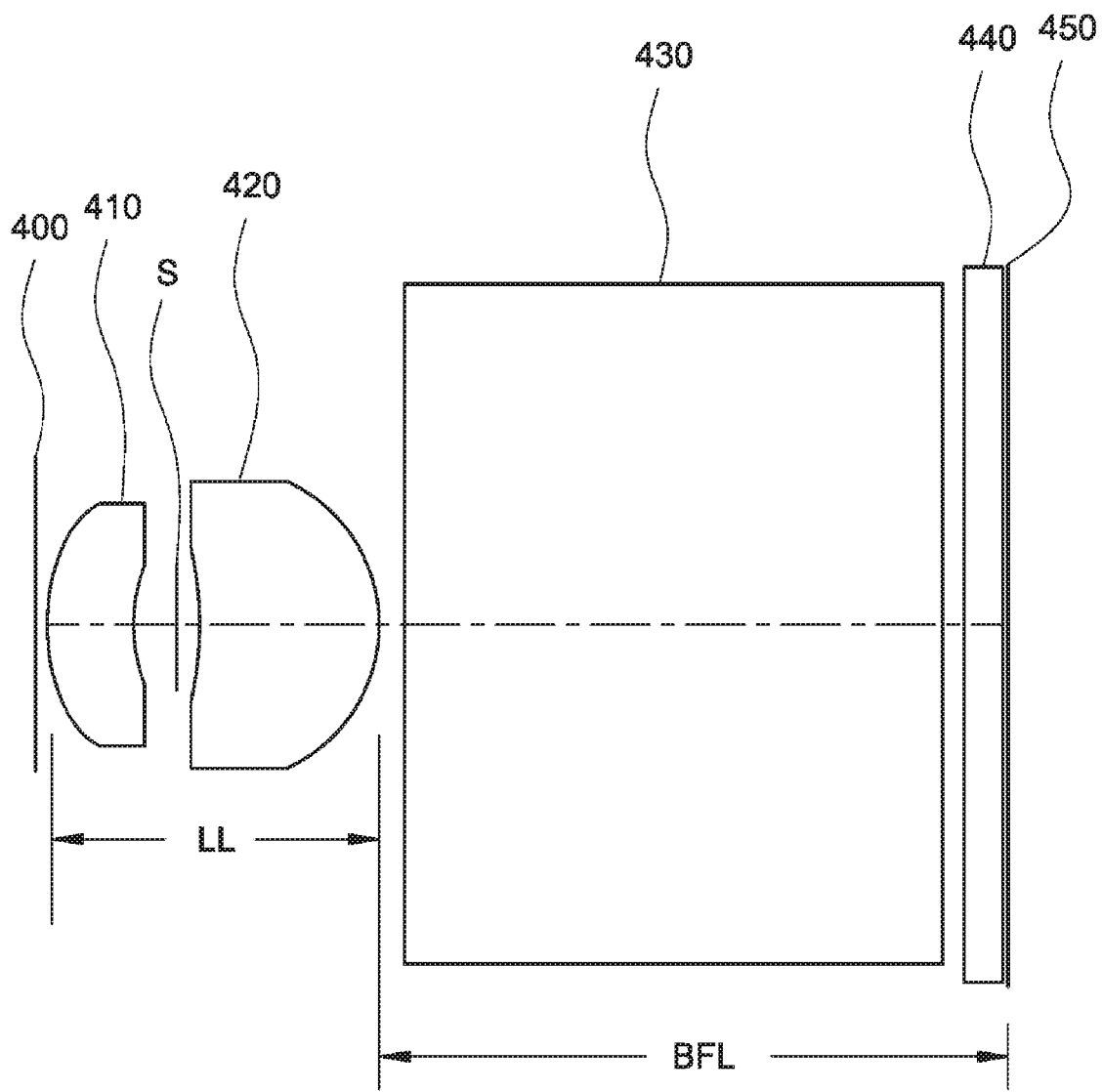
FIG. 4C is a schematic diagram of a lens assembly in accordance with a third embodiment of the invention.

FIG. 4C depicts a lens assembly in accordance with a third embodiment of the invention, which sequentially includes, from an object side to an image side along an optical axis, a first lens 410, a stop S, a second lens 420, a reflector 430, an optical fitter 440 and an image sensor 450. The first lens 410 is a negative meniscus lens with negative refractive power and has a surface facing the object side that is convex toward the object side and another surface facing the image side that is concave toward the object side. The second lens 420 is a positive meniscus lens with positive refractive power and has a surface facing the object side that is concave toward the image side and another surface facing the image side that is convex toward the image side. The total lens length LL is measured from the surface of the first lens 410 facing the object side to the surface of the second lens 420 facing the image side along the optical axis. The back focal length BFL of the lens assembly is measured from the surface of the second lens 420 facing the image side to the image sensor 450 along the optical axis. The lens assembly is disposed adjacent to the cover glass 400. The first lens 410 has a minimum dimension, measured along a line passing through the optical axis, less than that of the second lens 420 so that the first lens 410 of the lens assembly of the third embodiment can be embedded in the small space formed by the gap region 11, the display panel 20 and the case 25 in accordance with FIG. 2.

Table 5 shows the parameters of each lenses of the lens assembly of the third embodiment, wherein the effective focal length of the lens assembly is equal to 2.723 mm, the effective focal length of the first lens 410 is equal to −233.16 mm, the effective focal length of the second lens 420 is equal to 2.353 mm, the back focal length (BFL) is equal to 4.037 mm, the minimum side length VL of the image sensor 450 is equal to 2.748 mm, and the diagonal length DL of the image sensor 450 is equal to 4.58 mm. The total track length (TTL) of the lens assembly is equal to 6.175 mm. The view angle is equal to 79.86°. F-number is equal to 2.83.

TABLE 5

Effective Focal Length = 2.723 mm, F# = 2.83, View Angle = 79.86

| Element | Radius of Curvature (mm) | Distance (mm) | Nd | Vd | Conic Constant |
|---|---|---|---|---|---|
| OBJ | 0 | 350 | 0 | 0 | 0 |
| First Lens | 1.629947 | 0.554848 | 1.63 | 19.2 | −0.10445 |
|  | 1.399254 | 0.278709 | 0 | 0 | 7.044186 |
| Stop | 0 | 0.145438 | 0 | 0 | 0 |
| Second Lens | −2.36966 | 1.158858 | 1.525 | 70.1 | −3.18621 |
|  | −0.95052 | 0.15 | 0 | 0 | −1.22231 |
| Prism | 0 | 3.5 | 1.5 | 60 | 0 |
|  | 0 | 0.15 | 0 | 0 | 0 |
| Optical Filter | 0 | 0.21 | 1.5 | 60 | 0 |
|  | 0 | 0.027389 | 0 | 0 | 0 |
| Image Sensor | 0 | 0 | 0 | 0 | 0 |

The definition of the sag value z of the aspherical surfaces of each lens in Table 5 is identical to that in Table 1 of the first embodiment and therefore the descriptions thereof are omitted.

Table 6 shows the parameters of the aspherical surfaces of each lens of Table 5, wherein A to I are the aspheric coefficients.

TABLE 6

| Surface of Element | A / F | B / G | C / H | D / I | E |
|---|---|---|---|---|---|
| Object Side Surface of First Lens | 0.14614178 | −0.00221991 | 0.7879305 | −1.63946805 | 1.49240352 |
|  | 0.13148653 | 0.06989215 | 0 | 0 |  |
| Image Side Surface of First Lens | 0.40628026 | −8.15337261 | 103.2233081 | −578.6012948 | 576.1855006 |
|  | 6849.26548 | −20954.90807 | 0 | 0 |  |
| Object Side Surface of Second Lens | −0.05663947 | −0.32827193 | −3.78340226 | 113.0035361 | −650.1991978 |
|  | 1549.632337 | −1388.152328 | 0 | 0 |  |
| Image Side Surface of Second Lens | −0.19830722 | 0.48483964 | −1.49238978 | 1.97237548 | −1.15234316 |
|  | 0.12620422 | 0.0981305 | 0 | 0 |  |

Figure 5A:
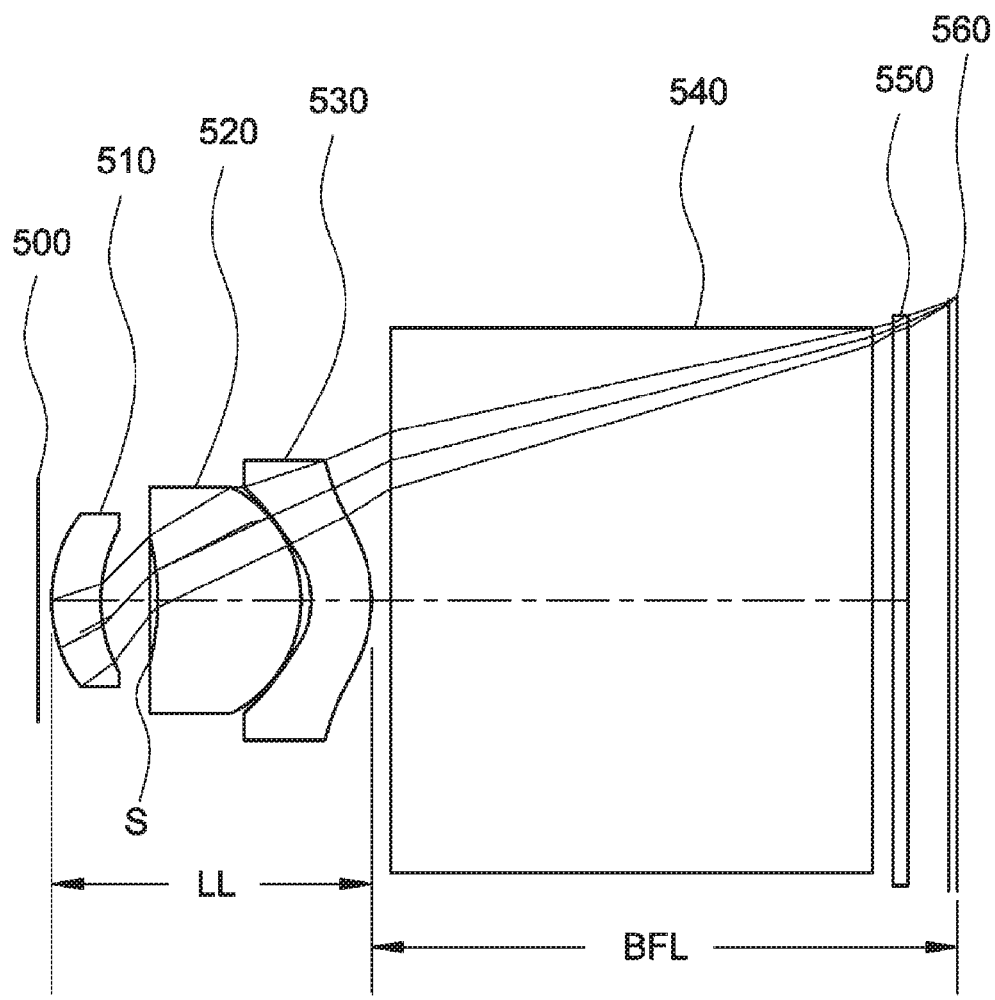
FIG. 5A is a schematic diagram of a lens assembly in accordance with a fourth embodiment of the invention.

FIG. 5A depicts a lens assembly in accordance with a fourth embodiment of the invention, which sequentially includes, from an object side to an image side along an optical axis, a first lens 510, a second lens 520, a third lens 530, a reflector 540, an optical filter 550, and an image sensor 560. The first lens 510 is a positive meniscus lens with positive refractive power and has a surface facing the object side that is convex toward the object side and another surface facing the image side that is concave toward the object side. The second lens 520 is a positive meniscus lens with positive refractive power and has a surface facing the object side that is concave toward the image side and another surface facing the image side that is convex toward the image side. The third lens 530 is a negative meniscus lens with negative refractive power and has a surface facing the object side that is concave toward the image side and another surface facing the image side that is convex toward the image side. The total lens length LL is measured from the surface of the first lens 510 facing the object side to the surface of the third lens 530 facing the image side along the optical axis. The back focal length BFL of the lens assembly is measured from the surface of the third lens 530 facing the image side to the image sensor 560 along the optical axis. The lens assembly is disposed adjacent to the cover glass 500. The first lens 510 has a minimum dimension, measured along a line passing through the optical axis, less than that of the second lens 520 and also less than that of the third lens 530 so that the first lens 510 of the lens assembly of the fourth embodiment can be embedded in the small space formed by the gap region 11, the display panel 20 and the case 25 in accordance with FIG. 2, Further, it is understood that an additional lens similar to the second lens 520 may be provided between the first and second lenses in the first, second, and third embodiments. That is, the second lens 520 in this embodiment could be treated as a third lens when disposed between the first lens and the second lens in the first, second, and third embodiments.

Table 7 shows the parameters of each lenses of the lens assembly of the fourth embodiment, wherein the effective focal length of the lens assembly is equal to 2.967 mm, the effective focal length of the first lens 510 is equal to 8.200 mm, the effective focal length of the second lens 520 is equal to 1.158 mm, the effective focal length of the third lens 530 is equal to −2.894 mm, the back focal length (BR) is equal to 4.2 mm. the minimum side length VL of the image sensor 560 is equal to 2.748 mm, and the diagonal length DL of the image sensor 560 is equal to 4.58 mm, The total track length (TTL) of the lens assembly is equal to 6.56 mm, The view angle is equal to 75.02°. F-number is equal to 2.4.

TABLE 7

| | | | | | |
|---|---|---|---|---|---|
| Effective Focal Length = 2.967 mm, F# = 2.4, View Angle = 75.02 | | | | | |
| Element | Radius of Curvature (mm) | Distance (mm) | Nd | Vd | Conic Constant |
| OBJ | 0 | 350 | 0 | 0 | 0 |
| First Lens | 1.334089 | 0.3509591 | 2.001780 | 25.639825 | 0.8736573 |
| | 1.380449 | 0.3583391 | 0 | 0 | 4.335034 |
| Stop | 0 | 0.145438 | 0 | 0 | 0 |
| Second Lens | −5.073596 | 1.054855 | 1.831571 | 40.250653 | −74.71653 |
| | −0.8891337 | 0.06362268 | 0 | 0 | −0.5903488 |
| Third Lens | −0.5741222 | 0.4372461 | 1.889815 | 19.338995 | −0.5903488 |
| | −1.002426 | 0.15 | 0 | 0 | −0.9499772 |
| Prism | 0 | 3.5 | 1.809712 | 45 | 0 |
| | 0 | 0.15 | 0 | 0 | 0 |
| Optical Filter | 0 | 0.11 | 1.5 | 60 | 0 |
| | 0 | 0.34596796 | 0 | 0 | 0 |
| Image Sensor | 0 | 0 | 0 | 0 | 0 |

The definition of the sag value z of the aspherical surfaces of each lens in Table 7 is identical to that in Table 1 of the first embodiment and therefore the descriptions thereof are omitted.

Table 8 shows the parameters of the aspherical surfaces of each lens of Table 7, wherein A to I are the aspheric coefficients.

TABLE 8

| Surface of Element | A<br>F | B<br>G | C<br>H | D<br>I | E |
|---|---|---|---|---|---|
| Object Side Surface of First Lens | 0.09864548<br>4.9073316 | −0.22665259<br>2.6331783 | 1.0545569<br>0 | −0.28655254<br>0 | −4.3020641 |
| Image Side Surface of First Lens | −0.00041029<br>6.7693968 | −0.10415372<br>−197.67434 | −1.2556885<br>0 | 1.9976829<br>0 | 3.2240827 |
| Object Side Surface of Second Lens | −0.34470394<br>−1336.5843 | 2.0200939<br>2071.9667 | −17.687228<br>0 | 40.190203<br>0 | 191.20218 |
| Image Side Surface of Second Lens | −0.13936276<br>4.5114969 | −0.01044956<br>−1.6651139 | 0.5885554<br>0 | 0.10856146<br>0 | −3.5322039 |
| Object Side Surface of Third Lens | 0.34589191<br>0.93029454 | 0.62835474<br>0.075703095 | 0.33877633<br>0 | −1.4460888<br>0 | 0.45633734 |
| Image Side Surface of Third Lens | 0.13150723<br>−0.10157512 | 0.05759652<br>0.002337948 | 0.19880175 | −0.48830579 | 0.37339742 |

Figure 5B:
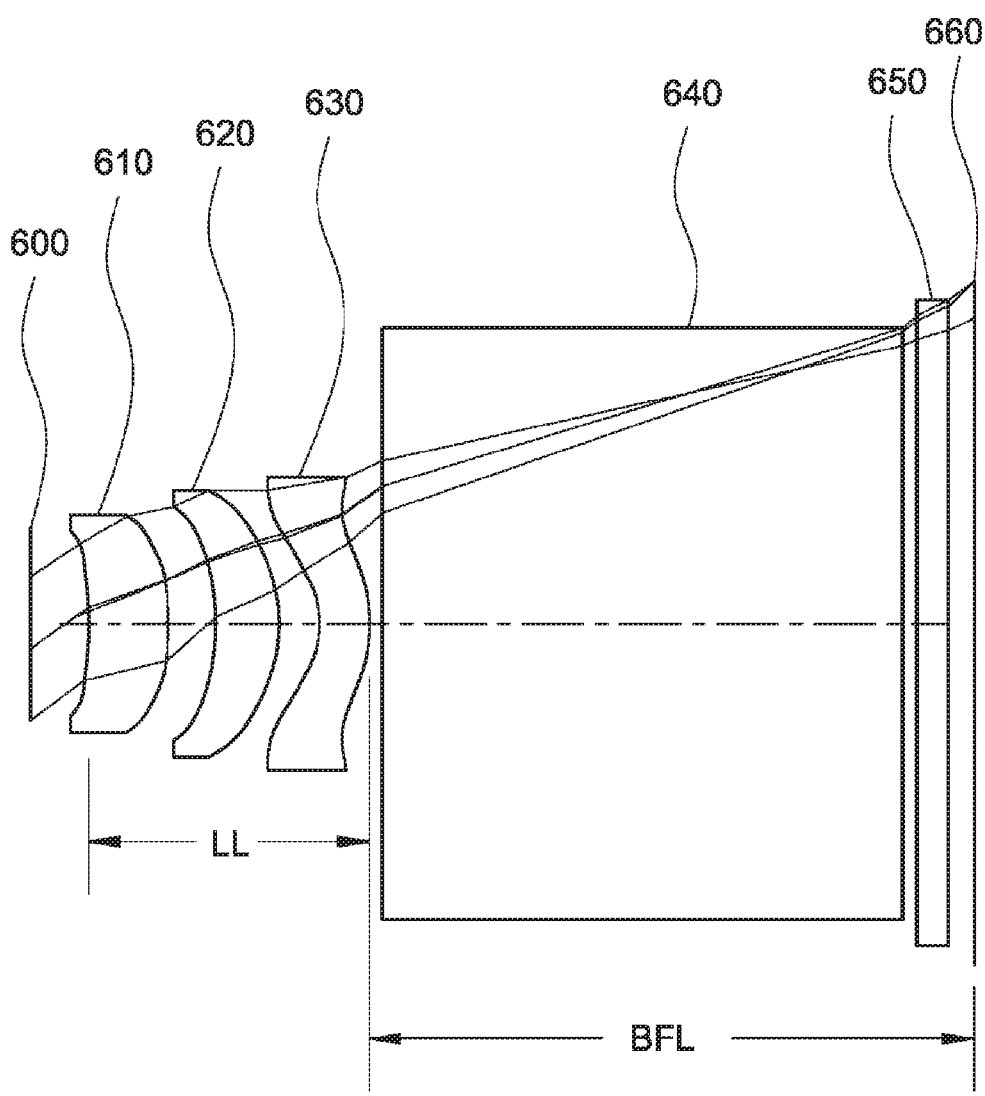
FIG. 5B is a schematic diagram of a lens assembly in accordance with a fifth embodiment of the invention.

FIG. 5B depicts a lens assembly in accordance with a fifth embodiment of the invention, which sequentially includes, from an object side to an image side along an optical axis, a first lens 610, a second lens 620, a third lens 630, a reflector 640, an optical filter 650, and an image sensor 660. The first lens 610 is a positive meniscus lens with positive refractive power and has a surface facing the object side that is concave toward the image side and another surface facing the image side that is convex toward the image side. The second lens 620 is a positive meniscus lens with positive refractive power and has a surface facing the object side that is concave toward the image side and another surface facing the image side that is convex toward the image side. The third lens 630 is a negative meniscus lens with negative refractive power and has a surface facing the object side that is concave toward the image side and another surface facing the image side that is convex toward the image side, The total lens length LL is measured from the surface of the first lens 610 facing the object side to the surface of the third lens 630 facing the image side along the optical axis. The back focal length BR, of the lens assembly is measured from the surface of the third lens 630 facing the image side to the image sensor 660 along the optical axis. The lens assembly is disposed adjacent to the cover glass 600. The first lens 610 has a minimum dimension, measured along a line passing through the optical axis, less than that of the second lens 620 and also less than that of the third lens 630 so that the first lens 610 of the lens assembly of the fifth embodiment can be embedded in the small space formed by the gap region 11, the display panel 20 and the case 25 in accordance with FIG. 2. Further, it is understood that an additional lens similar to the second lens 620 may be provided between the first and second lenses in the first, second, and third embodiments. That is, the second lens 620 in this embodiment could be treated as a third lens when disposed between the first lens and the second lens in the first, second, and third embodiments.

Table 9 shows the parameters of each lenses of the lens assembly of the fifth embodiment, wherein the effective focal length of the lens assembly is equal to 3.118 mm, the effective focal length of the first lens 610 is equal to 1.879 mm, the effective focal length of the second lens 620 is equal to 5.540 mm, the effective focal length of the third lens 630 is equal to −3.290 mm, the back focal length is equal to 4.06 mm, the minimum side length VL of the image sensor 660 is equal to 2.748 mm, and the diagonal length DL of the image sensor 660 is equal to 4.58 mm. The total track length TTL of the lens assembly is equal to 6.33 mm. The view angle is equal to 72.2°. F-number is equal to 2.4.

TABLE 9

| | | | | | |
|---|---|---|---|---|---|
| Effective Focal Length = 3.118 mm, F# = 2.4, View Angle = 72.2 | | | | | |
| Element | Radius of Curvature (mm) | Distance (mm) | Nd. | Vd | Conic Constant |
| OBJ | 0 | 350 | 0 | 0 | 0 |
| Stop | 0 | 0.3767075 | 0 | 0 | 0 |
| First Lens | −7.018379 | 0.5550973 | 1.829334 | 45.278091 | 110.1326 |
| | −1.325355 | 0.3069532 | 0 | 0 | 0.7106521 |
| Second Lens | −1.681919 | 0.4242216 | 1.642701 | 65.000424 | −0.5154039 |
| | −1.256396 | 0.2677134 | 0 | 0 | −8.745995 |
| Third Lens | −0.6173412 | 0.342343 | 1.857821 | 19.238398 | −0.708503 |
| | −0.9909463 | 0.1 | 0 | 0 | −1.685939 |
| Prism | 0 | 3.484907 | 2.000335 | 25.702077 | 0 |
| | 0 | 0.1 | 0 | 0 | 0 |
| Optical Filter | 0 | 0.21 | 1.5168 | 64.167336 | 0 |
| | 0 | 0.4704057 | 0 | 0 | 0 |
| Image Sensor | 0 | 0 | 0 | 0 | 0 |

The definition of the sag value z of the aspherical surfaces of each lens in Table 9 is identical to that in Table 1 of the first embodiment and therefore the descriptions thereof are omitted.

Table 10 shows the parameters of the aspherical surfaces of each lens of Table 9, wherein A to I are the aspheric coefficients.

TABLE 10

| Surface of Element | A F | B G | C H | D I | E |
|---|---|---|---|---|---|
| Object Side Surface of First Lens | −0.14959082 −48.898686 | −1.2789568 −73.919775 | 9.6006869 −8.2102199 | −43.120738 135.30804 | 88.800354 |
| Image Side Surface of First Lens | −0.048437596 −0.03020776 | −0.037908987 0.029448877 | −0.037193284 −0.081068492 | −0.053734942 −0.40048698 | −0.052788849 |
| Object Side Surface of Second Lens | 0.03839388 0.47792274 | −0.19135004 −0..38159564 | −0.30648521 −1.7115256 | −0.10822708 2.1392232 | 0.32643821 |
| Image Side Surface of Second Lens | −0.60998337 4.1975469 | 0.80444752 −2.4115265 | −1.5493102 0.93396153 | 2.8885572 −0.31977411 | −4.3264924 |
| Object Side Surface of Third Lens | 0.31517861 −0.49784554 | 1.0205714 −1.2954145 | 0.142778 −0.16440565 | −3.3684028 0.51281663 | 4.0710286 |
| Image Side Surface of Third Lens | 0.11954335 1.0350871 | 0.20497253 −0.49459184 | 0.57794972 −0.03185893 | −0.94890155 0.022330882 | −0.1882802 |

Figure 5C:
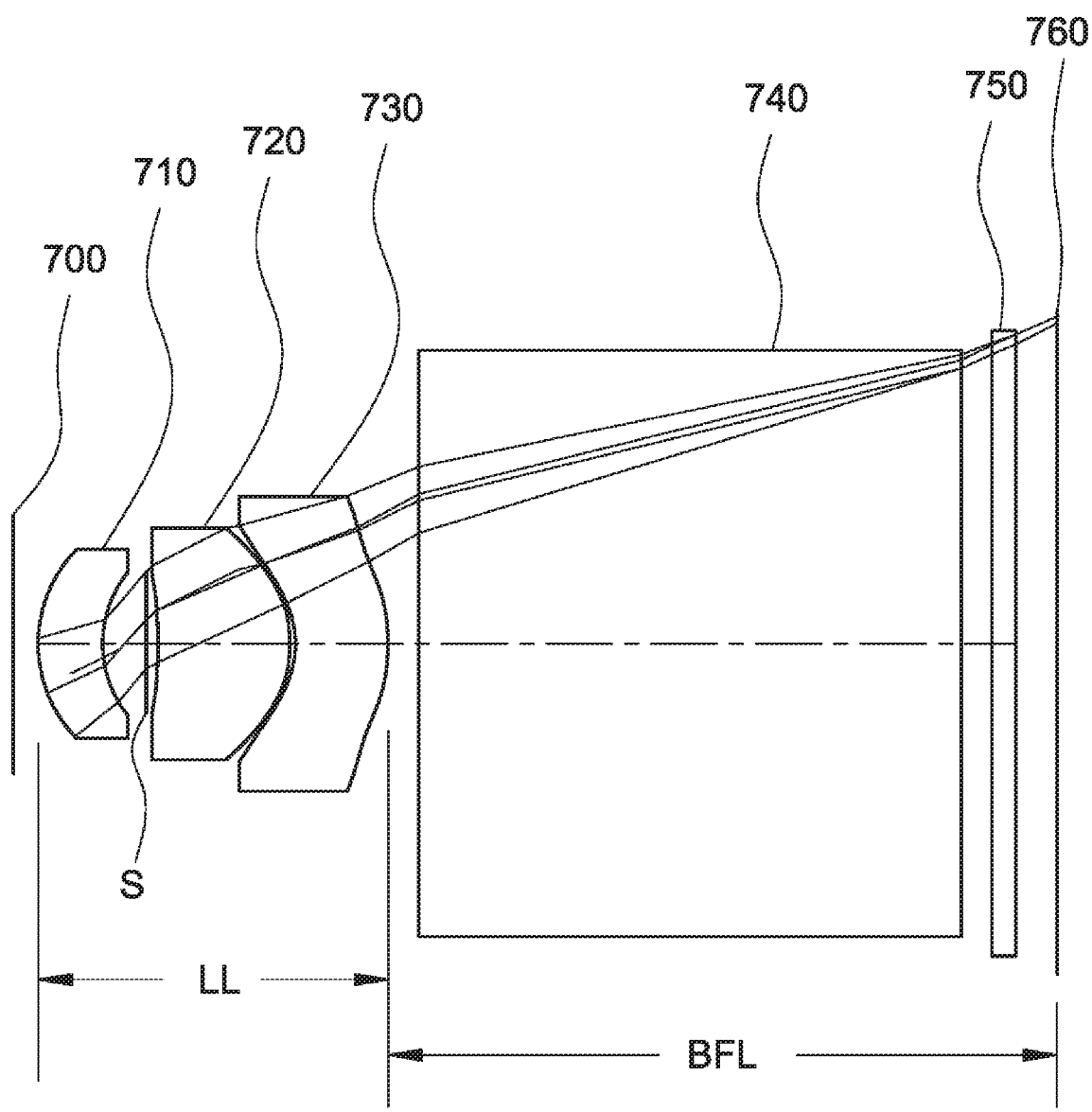
FIG. 5C is a schematic diagram of a lens assembly in accordance with a sixth embodiment of the invention.

FIG. 5C depicts a lens assembly in accordance with a sixth embodiment of the invention, which sequentially includes, from an object side to an image side along an optical axis, a first lens 710, a stop S, a second lens 720, a third lens 730, a reflector 740, an optical filter 750, and an image sensor 760. The first lens 710 is a positive meniscus lens with positive refractive power and has a surface facing the object side that is convex toward the object side and another surface facing the image side that is concave toward the object side. The second lens 720 is a positive meniscus lens with positive refractive power and has a surface facing the object side that is concave toward the image side and another surface facing the image side that is convex toward the image side. The third lens 730 is a negative meniscus lens with negative refractive power and has a surface facing the object side that is concave toward the image side and another surface facing the image side that is convex toward the image side. The total lens length LL is measured from the surface of the first lens 710 facing the object side to the surface of the third lens 730 facing the image side along the optical axis. The back focal length BFL of the lens assembly is measured from the surface of the third lens 730 facing the image side to the image sensor 760 along the optical axis. The lens assembly is disposed adjacent to the cover glass 700. The first lens 710 has a minimum dimension, measured along a line passing through the optical axis, less than that of the second lens 720 and also less than that of the third lens 730 so that the first lens 710 of the lens assembly of the sixth embodiment can be embedded in the small space formed by the gap region 11, the display panel 20 and the case 25 in accordance with FIG. 2. Further, it is understood that an additional lens similar to the second lens 720 may be provided between the first and second lenses in the first, second, and third embodiments. That is, the second lens 720 in this embodiment could be treated as a third lens when disposed between the first lens and the second lens in the first, second, and third embodiments.

Table 11 shows the parameters of each lenses of the lens assembly of the sixth embodiment, wherein the effective focal length of the lens assembly is equal to 2.976 mm, the effective focal length of the first lens 710 is equal to 31.873 mm, the effective focal length of the second lens 720 is equal to 0.938 mm, the effective focal length of the third lens 730 is equal to −2.249 mm, the back focal length is equal to 4.32 mm, the minimum side length VL of the image sensor 760 is equal to 2.748 mm, and the diagonal length DL of the image sensor 760 is equal to 4.58 mm. The total track length TTL of the lens assembly is equal to 6.58 mm. The view angle is equal to 74.97°. F-number is equal to 2.4.

TABLE 11

Effective Focal Length = 2.976 mm, F# = 2.4, View Angle = 74.97

| Element | Radius of Curvature (mm) | Distance (mm) | Nd | Vd | Conic Constant |
|---|---|---|---|---|---|
| OBJ | 0 | 650 | 0 | 0 | 0 |
| First Lens | 1.236955 | 0.4052615 | 2.001784 | 19.324978 | 0.8990257 |
|  | 1.074454 | 0.2756472 | 0 | 0 | 1.785657 |
| Stop | 0 | 0.0601895 |  |  |  |
| Second Lens | −60.40194 | 0.869349 | 1.85996 | 40.279985 | 11871.22 |
|  | −0.8049648 | 0.03697004 | 0 | 0 | −0.5232803 |
| Third Lens | −0.6216925 | 0.5944137 | 2.001784 | 19.324978 | −0.5371264 |
|  | −1.266767 | 0.2 | 0 | 0 | −0.9880563 |
| Prism | 0 | 3.5 | 1.809712 | 45 | 0 |
|  | 0 | 0.2 | 0 | 0 | 0 |
| Optical Filter | 0 | 0.145 | 1.5 | 60 | 0 |
|  | 0 | 0.28072477 | 0 | 0 | 0 |
| Image Sensor | 0 | 0 | 0 | 0 | 0 |

The definition of the sag value z of the aspherical surfaces of each lens in Table 11 is identical to that in Table 1 of the first embodiment and therefore the descriptions thereof are omitted.

Table 12 shows the parameters of the aspherical surfaces of each lens of Table 11, wherein A to I are the aspheric coefficients.

TABLE 12

| Surface of Element | A F | B G | C H | D I | E |
|---|---|---|---|---|---|
| Object Side Surface of First Lens | 0.03956093 1.4938618 | 0.24019146 −2.5941814 | −0.35562492 0 | 0.15966913 0 | 0.76071241 |
| Image Side Surface of First Lens | 0.11593447 571.68505 | 0.44058424 −607.96865 | 2.9297244 0 | −7.2994234 0 | −84.434355 |
| Object Side Surface of Second Lens | −0.28422047 −1028.2389 | 2.9995437 1367.2081 | −21.42008 0 | 37.521891 0 | 200.68143 |
| Image Side Surface of Second Lens | −0.12365277 11.498056 | 0.76210586 −5.8119827 | −0.070613672 0 | −0.36825138 0 | −6.0327999 |
| Object Side Surface of Third Lens | 0.37120259 3.4831056 | 0.9935436 −2.3037101 | 0.61290992 0 | −3.6224196 0 | 1.7938391 |
| Image Side Surface of Third Lens | 0.09263354 −0.25054501 | 0.06853521 0.053084637 | 0.06776226 0 | −0.29808174 0 | 0.41013851 |

Figure 6:
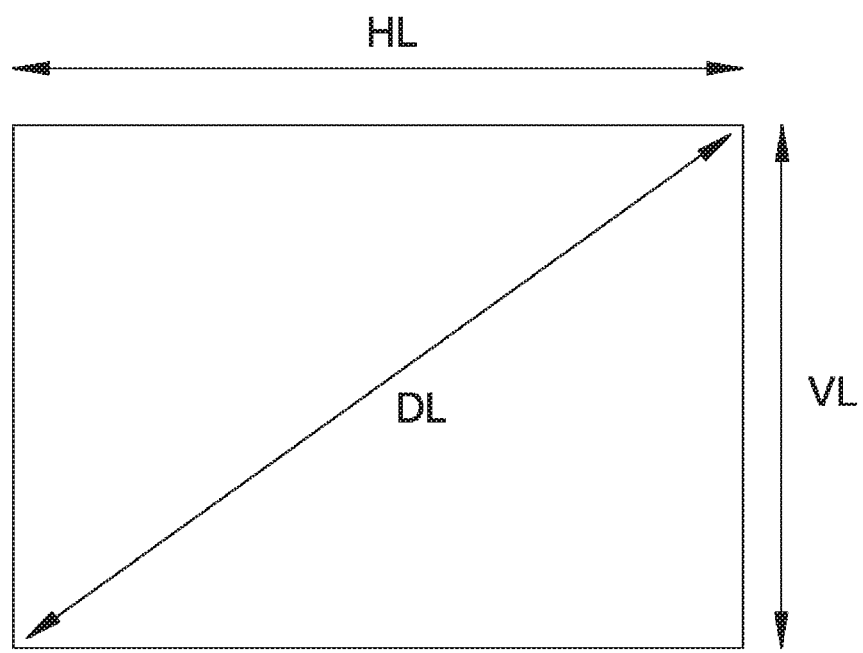
FIG. 6 is a top view of an image sensor in each of the embodiments of the invention.

FIG. 6 is a top view of the image sensor in each of the above embodiments, wherein the minimum side length VL of the image sensor is equal to 2.748 mm and the diagonal length DL of the image sensor is equal to 4.58 mm.

According to FIGS. 3A and 6, the minimum side of the image sensor is substantially perpendicular to the cover glass and the maximum side of the image sensor is substantially parallel to the cover glass. By such arrangement, the lens device of the invention is able to have the most reduced volume without increasing any thickness of a handheld mobile device.

The optical parameters of the above embodiments of the invention are collected and organized in Table 13.

TABLE 13

|  | First Embodiment | Second Embodiment | Third Embodiment | Fourth Embodiment | Fifth Embodiment | Sixth Embodiment |
| --- | --- | --- | --- | --- | --- | --- |
| f | 3.034 | 2.994 | 2.723 | 2.967 | 3.118 | 2.976 |
| TTL | 6.2 | 5.63 | 6.175 | 6.56 | 6.33 | 6.58 |
| BFL | 4.119 | 3.78 | 4.037 | 4.2 | 4.06 | 4.32 |
| f1 | 1.713 | 1.636 | −233.16 | 8.200535 | 1.879017 | 31.87383 |
| f2 | −4.972 | −4.421 | 2.353 | 1.157761 | 5.540351 | 0.938083 |
| f3 | N.A. | N.A. | N.A. | −2.89416 | −3.2902 | −2.24974 |
| CAMX | 1.902409 | 1.851857 | 1.914576 | 2.128862 | 1.98421 | 2.04286 |
| CAMN | 1.26543 | 1.248309 | 0.8 | 0.96645 | 1.259485 | 0.979968 |
| D1 | 1.26543 | 1.248309 | 1.579 | 1.3 | 1.259485 | 1.3 |
| ALT | 1.189126 | 1.145959 | 1.713706 | 1.84306 | 1.321662 | 1.869024 |
| LL | 1.736 | 1.642 | 2.138 | 2.311 | 1.896 | 2.242 |

In table 13, all parameters are in unit of millimeter (m). The effective focal length f of the lens assembly of the above embodiments of the invention is shown in the second row. The total track length TTL of the lens assembly of the above embodiments of the invention is shown in the third row. The back focal length BFL of the lens assembly of the above embodiments of the invention is shown in the fourth row, which is the distance between the image side surface of the lens adjacent to the image side and the image sensor along the optical axis. The focal length of the first lens f1 of the lens assembly of the above embodiments of the invention is shown in the fifth row. The focal length of the second lens f2 of the lens assembly of the above embodiments of the invention is shown in the sixth row. The focal length of the third lens f3 of the lens assembly of the above embodiments of the invention is shown in the seventh row. The maximum dimension of clear aperture CAMX of the lenses of the lens assembly of the above embodiments of the invention measured along a line passing through the optical axis is shown in the eighth row. The minimum dimension of clear aperture CAMN of the lenses of the lens assembly of the above embodiments of the invention measured along a line passing through the optical axis is shown in the ninth row, from which it is understood that the gap region 11 of the cover glass is not greater than 2 mm. The dimension of clear aperture D1 of the object-side surface of the first lens of the above embodiments of the invention measured along a line passing through the optical axis is shown in the tenth row. The all-lens thickness of the lenses along the optical axis ALT of the lens assembly of the above embodiments is shown in the eleventh row, wherein the all-lens thickness ALT is a sum of thicknesses of the lenses along the optical axis without including the air spacing therebetween. The total lens length LL for lenses of the lens assembly of the above embodiments of the invention measured from the object side to the image side along the optical axis is shown in the twelfth row, in other words, LL is the distance between the object side surface of the lens which is closest to the object side and the image side surface of another lens which is closest to the image side along the optical axis.

The lens assembly of the invention is configured to satisfy the conditions in the following tables 14 and 15, with all the parameters of the above embodiments to be verified therein.

TABLE 14

| Condition | First Embodiment | Second Embodiment | Third Embodiment |
| --- | --- | --- | --- |
| BFL ≥ VL | 4.119 ≥ 2.748 | 3.78 ≥ 2.748 | 4.037 ≥ 2.748 |
| BFL ≥ 0.6 × DL | 4.119 ≥ 0.6 × 4.58 | 3.78 ≥ 0.6 × 4.58 | 4.037 ≥ 0.6 × 4.58 |
| BFL > LL | 4.119 > 1.736 | 3.78 > 1.642 | 4.037 > 2.138 |
| 1.1 < (TTL/BFL) < 2 | (TTL/BFL) = 1.50522 | (TTL/BFL) = 1.48942 | (TTL/BFL) = 1.52960 |
| 1 < (BFL/f) < 1.6 | (BFL/f) = 1.359406 | (BFL/f) = 1.264214 | (BFL/f) = 1.482556 |
| 0.6 < CAMN < 2 | CAMN = 1.26543 | CAMN = 1.248309 | CAMN = 0.8 |
| 2.5 < (BFL/CAMN) < 6 | (BFL/CAMN) = 3.255 | (BFL/CAMN) = 3.028 | (BFL/CAMN) = 5.046 |
| 2 < (BFL/D1) < 4 | (BFL/D1) = 3.256126 | (BFL/D1) = 3.028846 | (BFL/D1) = 2.556681 |
| 0.1 < (ALT/BFL) < 0.6 | (ALT/BFL) = 0.28869 | (ALT/BFL) = 0.30316 | (ALT/BFL) = 0.4245 |
| 0.5 < (D1/ALT) < 1.5 | (D1/ALT) = 1.063807 | (D1/ALT) = 1.089044 | (D1/ALT) = 0.921395 |

TABLE 15

| Condition | Fourth Embodiment | Fifth Embodiment | Sixth Embodiment |
|---|---|---|---|
| BFL ≥ VL | 4.2 ≥ 2.748 | 4.06 ≥ 2.748 | 4.32 ≥ 2.748 |
| BFL ≥ 0.6 × DL | 4.2 ≥ 0.6 × 4.58 | 4.06 ≥ 0.6 × 4.58 | 4.32 ≥ 0.6 × 4.58 |
| BFL > LL | 4.2 > 2.311 | 4.06 > 1.896 | 4.32 > 2.242 |
| 1.1 < (TTL/BFL) < 2 | (TTL/BFL) = 1.56191 | (TTL/BFL) = 1.55911 | (TTL/BFL) = 1.52315 |
| 1 < (BFL/f) < 1.6 | (BFL/f) = 1.415571 | (BFL/f) = 1.302117 | (BFL/f) = 1.451613 |
| 0.6 < CAMN < 2 | CAMN = 0.96645 | CAMN = 1.259485 | CAMN = 0.979968 |
| 2.5 < (BFL/CAMN) < 6 | (BFL/CAMN) = 4.346 | (BFL/CAMN) = 3.224 | (BFL/CAMN) = 4.408 |
| 2 < (BFL/D1) < 4 | (BFL/D1) = 3.230769 | (BFL/D1) = 3.224782 | (BFL/D1) = 3.323077 |
| 0.1 < (ALT/BFL) < 0.6 | (ALT/BFL) = 0.43882 | (ALT/BFL) = 0.32553 | (ALT/BFL) = 0.43264 |
| 0.5 < (D1/ALT) < 1.5 | (D1/ALT) = 0.705349 | (D1/ALT) = 0.952589 | (D1/ALT) = 0.69555 |

The thickness of the lens device can be reduced when the lens assembly satisfies the condition BFL>LL. Therefore, a smart phone, a tablet computer or other smart mobile devices can still meet the requirement of miniaturization even if the lens device of the invention is disposed under the cover glass of the smart phone, the tablet computer or other smart mobile devices.

In each of the above embodiments, the reflector is a prism. However, it is understood that a reflective mirror can be used as a substitute to function the same. Further, it is worth noting that the reflector includes a reflecting surface with a metal film formed thereon. The metal film may contain, for example, aluminum (Al), silver (Ag) and so on. The metal film can be formed on the reflecting surface in any proper way, for example, by coating. By such arrangement, both the chromatic aberration and flare can be avoided when an image is formed. Therefore, the invention is capable of improving chromatic aberration, effectively focusing the point light source, and providing the lens assembly with good image-forming quality.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens assembly comprising:
a plurality of lenses;
a reflector: and
an image sensor;
wherein the lenses, the reflector and the image sensor are sequentially arranged from an object side to an image side along an optical axis;
wherein one of the lenses is adjacent to the object side, has an outer circumferential portion which is non-circular, and has a minimum dimension of clear aperture measured along a line passing through the optical axis;
wherein the lens assembly satisfies at least one of following conditions:

BFL≥VL; and

BFL≥6×DL;

where BFL is a back focal length of the lens assembly, VL is a minimum side length of the image sensor, and DL is a diagonal length of the image sensor.

2. The lens assembly as claimed in claim 1, further satisfying condition BFL>LL; where LL is a distance between an object side surface of the lens which is closest to the object side and an image side surface of another lens which is closest to the image side along the optical axis.

3. The lens assembly as claimed in claim 1, further satisfying at least one of following conditions:

1.1<(TTL/BFL)<2;

1<(BFL/f)<1.6;

where TLL is a total track length of the lens assembly and f is an effective focal length of the lens assembly.

4. The lens assembly as claimed in claim 1, further satisfying at least one of following conditions:

0.6<CAMN<2;

2.5<(BFL/CAMN)<6;

where CAMN is a minimum dimension of clear aperture of the lenses that is measured along a line passing through the optical axis.

5. The lens assembly as claimed in claim 4, further satisfying condition 2<(BFL/D1)<4; where D1 is a dimension of clear aperture of an object-side surface of the lens adjacent to the object side, measured along a line passing through the optical axis.

6. The lens assembly as claimed in claim 5, further satisfying condition 0.1<(ALT/BFL)<0.6 where ALT is a sum of thicknesses of the lenses measured along the optical axis without including air spacing between the lenses.

7. The lens assembly as claimed in claim 6, further satisfying condition 0.5<(D1/ALT)<1.5.

8. The lens assembly as claimed in claim 1, wherein:
the reflector is a prism or a reflective mirror; and
the reflector comprises a reflecting surface with a metal film formed thereon.

9. The lens assembly as claimed in claim 8, further comprising a stop;
wherein the lenses comprise a first lens and a second lens;
wherein the first lens, the second lens, and the reflector are sequentially arranged from the object side to the image side along the optical axis;
wherein the first lens is with refractive power;
wherein the second lens is with refractive power, has a surface facing the object side, intersecting with the optical axis, and being concave toward the image side, and has another surface facing the image side, intersecting with the optical axis, and being convex toward the image side;
wherein the stop is disposed between the object side and the second lens.

10. The lens assembly as claimed in claim 9, wherein the first lens is with postitive refractive power and has a surface intersecting with the optical axis, facing the image side, and being convex toward the image side; and the second lens is with negative refractive power.

11. The lens assembly as claimed in claim 9, wherein:
the first lens is with negative refractive power;
the first lens has a surface intersecting with the optical axis, facing the object side, and being convex toward the object side, and has another surface intersecting with the optical axis, facing the image side, and being concave toward the object side; and
the second lens is with positive refractive power.

12. The lens assembly as claimed in claim 9, wherein:
the lenses further comprise a third lens disposed between the first lens and the second lens;
the first lens, the third lens, and the second lens are sequentially arranged from the object side to the image side along the optical axis;
the first lens is with positive refractive power;
the third lens is with positive retractive power;
the third lens has a surface intersecting with the optical axis, facing the object side, and being concave toward the image side, and has another surface intersecting with the optical axis, facing the image side, and being convex toward the image side; and
the second lens is with negative refractive power.

13. The lens assembly as claimed in claim 12, wherein the first lens has a surface intersecting with the optical axis, facing the object side, and being convex toward the object side, and has another surface intersecting with the optical axis, facing the image side, and being concave toward the object side.

14. The lens assembly as claimed in claim 12, wherein the first lens has a surface intersecting with the optical axis, facing the object side, and intersecting with the optical axis, facing the image side, and being convex toward the image side.

15. A lens device, comprising:
a cover glass;
a case;
a display panel disposed adjacent to the cover glass wherein a gap is formed between the display panel and the case, thereby forming a display region where the cover glass covers the display panel and forming a gap region where the cover glass covers the gap; and
the lens assembly as claimed in claim 1. configured to be disposed under the cover glass, in the gap region and outside the display region;
wherein the lens assembly further comprises another reflector and a stop;
wherein the another reflector is disposed between the cover glass and the plurality of lenses, and the stop is disposed in the plurality of lenses;
wherein light from the object side is configured to propagate through the cover glass, the another reflector, the plurality of lenses and the reflector to the image sensor.

16. A lens device, comprising:
a case;
a display panel, wherein a gap is formed between the display panel and the case, thereby forming a display region and a gap region; and
a lens assembly as claimed in claim 1, configured to be disposed in the gap region and outside the display region.

17. The lens device as claimed in claim 16, further comprising a cover glass;
wherein the display panel is disposed adjacent to the cover glass;
wherein the display region is located at where the cover glass covers the display panel;
wherein the gap region is located at where the cover glass covers the gap;
wherein the lens assembly is further disposed under the cover glass;
wherein the lenses comprise a first lens and a second lens sequentially arranged from the object side to the image side along the optical axis, and the second lens has a concave surface facing the object side and a convex surface facing the image side.

18. The lens device as claimed in claim 17, wherein the first lens has a convex surface facing the object side and a concave surface facing the image side.

19. The lens device as claimed in claim 17, wherein the lenses further comprise a third lens which has a concave surface facing the object side and a convex surface facing the image side.

20. The lens device as claimed in claim 17, wherein the lens assembly further satisfies at least one of following conditions:

$BFL>LL;$ $1.1<(TTL/BFL)<2;$ $1<(BFL/f)<1.6;$ $0.6<CAMN<2;$ $2.5<(BFL/CAMN)<6;$ $2<(BFL/D1)<4;$ $0.1<(ALT/BFL)<0.6;$ $0.5<(D1/ALT)<1.5$ where LL is a distance between an object side surface of the lens which is closest to the object side and an image side surface of another lens which is closest to the image side along the optical axis, TLL is a total track length of the lens assembly, f is an effective focal length of the lens assembly, CAMN is a minimum dimension of clear aperture of the lenses that is measured along a line passing through the optical axis, D1 is a dimension of clear aperture of an object-side surface of the lens adjacent to the object side that is measured along a line passing through the optical axis, and ALT is a sum of thicknesses of the lenses measured along the optical axis without including air spacing between the lenses.

* * * * *